US012599529B2

(12) United States Patent
Hwang

(10) Patent No.: US 12,599,529 B2
(45) Date of Patent: Apr. 14, 2026

(54) FOOT CONTROLLER FOR DENTAL UNIT CHAIR

(71) Applicant: OSSTEMIMPLANT CO., LTD., Seoul (KR)

(72) Inventor: Dae Yong Hwang, Seoul (KR)

(73) Assignee: OSSTEMIMPLANT CO., LTD., Seoul (KR)

(*) Notice: Subject to any disclaimer, the term of this patent is extended or adjusted under 35 U.S.C. 154(b) by 678 days.

(21) Appl. No.: 18/010,689

(22) PCT Filed: Apr. 13, 2021

(86) PCT No.: PCT/KR2021/004659
§ 371 (c)(1),
(2) Date: Dec. 15, 2022

(87) PCT Pub. No.: WO2022/004993
PCT Pub. Date: Jan. 6, 2022

(65) Prior Publication Data

US 2025/0262108 A1 Aug. 21, 2025

(30) Foreign Application Priority Data

Jun. 30, 2020 (KR) ........................ 10-2020-0079899

(51) Int. Cl.
*A61G 15/02* (2006.01)

(52) U.S. Cl.
CPC .......... *A61G 15/02* (2013.01); *A61G 2203/10* (2013.01)

(58) Field of Classification Search
CPC .... A61G 15/02; A61G 2203/10; A61G 15/00; A61G 15/10; A61G 15/14; H01H 3/14;
(Continued)

(56) References Cited

U.S. PATENT DOCUMENTS

2010/0060614 A1* 3/2010 Enns ..................... A63F 13/245 345/184
2017/0087730 A1* 3/2017 Robinson ................. B25J 5/007

FOREIGN PATENT DOCUMENTS

JP 2003-019147 A 1/2003
JP 3861324 B2 12/2006
(Continued)

OTHER PUBLICATIONS

International Search Report of PCT/KR2021/004659 dated Jul. 27, 2021 [PCT/ISA/210].

*Primary Examiner* — Anthony R Jimenez
(74) *Attorney, Agent, or Firm* — Sughrue Mion, PLLC

(57) ABSTRACT

The present invention provides a foot controller for a dental unit chair capable of easily and conveniently controlling the amount of air supplied to a treatment tool provided in the dental unit chair. The present invention provides a foot controller for a dental unit chair, including: an air valve configured to control a flow rate of air supplied to the treatment tool; a cam block configured to be installed under a rod provided in the air valve and having an inclined surface; a pedal unit configured to be disposed at a location spaced apart from the cam block by a predetermined distance and rotatable left and right by an external force and movable up and down; and a connection part configured to connect the cam block and the pedal unit so that the cam block moves in conjunction with movement of the pedal unit.

9 Claims, 19 Drawing Sheets

(58) Field of Classification Search
CPC ........ H01H 13/00; H01H 13/14; H01H 15/00; H01H 15/10; G06F 3/00; G06F 3/01; A61C 17/00; A61C 17/005; A61C 17/02; A61C 17/0202; A61C 17/0205; A61C 17/0208; A61C 17/0211; A61C 17/022; A61C 17/024; A61C 17/028; A61C 17/032; A61C 17/06; A61C 17/08; A61C 17/16; A61C 17/18; A61C 17/20; A61C 17/22; A61C 17/26; A61C 17/28; A61C 17/34; A61C 1/00; A61C 1/007; A61C 1/0015; A61C 1/0023; A61C 1/003; A61C 1/0038; A61C 1/0061; A61C 7/00
USPC .......................................................... 200/86.5
See application file for complete search history.

(56) References Cited

FOREIGN PATENT DOCUMENTS

| | | | |
|---|---|---|---|
| JP | 2019-010515 | A | 1/2019 |
| KR | 20-0377134 | Y1 | 3/2005 |
| KR | 10-2046092 | B1 | 11/2019 |

* cited by examiner

FOOT CONTROLLER FOR DENTAL UNIT CHAIR

CROSS REFERENCE TO RELATED APPLICATIONS

This application is a National Stage of International Application No. PCT/KR2021/004659 filed on Apr. 13, 2021, claiming priority based on Korean Patent Application No. 10-2020-0079899 filed on Jun. 30, 2020, the entire disclosures of which are incorporated herein by reference.

TECHNICAL FIELD

The present invention relates to a foot controller for a dental unit chair, and more particularly, to a foot controller for a dental unit chair through which an operator may easily and conveniently control the amount of air supplied to a treatment tool of the dental unit chair.

BACKGROUND ART

In general, dental care and treatment are performed in an oral cavity of a patient in a state in which an examinee lies on a unit chair.

A dental unit chair may include a lighting device to illuminate the oral cavity, a doctor table equipped with various treatment tools, a unit chair monitor arm to install a monitor for showing an inside of the oral cavity, displaying CT image information, or watching TV, a water supply device, a table for patient convenience, etc.

Various devices or instruments installed in the unit chair are installed so as to have an efficient movement and convenient operation in order to provide movement and convenience of a patient or an operator and sufficient functions during procedure.

Meanwhile, when an operator treats an examinee located in the unit chair, it is common to use various treatment tools such as a handpiece provided in the unit chair and a foot controller to control a chair on which the examinee sits or lies by foot manipulation.

DISCLOSURE

Technical Problem

The present invention provides a foot controller for a dental unit chair that enables an operator to easily and conveniently control the amount of air supplied to a treatment tool provided in the dental unit chair.

Technical Solution

In one general aspect, a foot controller for a dental unit chair for controlling a treatment tool provided in the dental unit chair may include: an air valve configured to control a flow rate of air supplied to the treatment tool; a cam block configured to be installed under a rod provided in the air valve and having an inclined surface; a pedal unit configured to be disposed at a location spaced apart from the cam block by a predetermined distance and rotatable left and right by an external force and movable up and down; and a connection part configured to connect the cam block and the pedal unit so that the cam block moves in conjunction with movement of the pedal unit.

The foot controller may further include: a rail configured to guide a left and right rotation of the pedal unit.

A range of the left and right rotation of the pedal unit may be limited by a length of the rail.

When the cam block rotates left and right according to the left and right rotation of the pedal unit, the air valve and the cam block may be disposed so that the rod of the air valve is always located above the inclined surface.

The air valve and the cam block may be disposed so that a distance between the inclined surface and the rod is changed by the left and right rotation of the connection part according to the left and right rotation of the pedal unit.

The air valve and the cam block may be disposed so that the rod is pressed or unpressed by the up and down movement of the connection part according to the up and down movement of the pedal unit.

The degree of pressing of the rod may vary according to a location at which the pedal unit moves downward in the range of the left and right rotation of the pedal unit.

The air valve may control the amount of air supplied to the treatment tool as the degree of pressing of the rod varies.

The foot controller may further include: when the pedal unit moves downward by an external force and then the external force disappears, an elastic member configured to provide a restoring force to return the pedal unit to an original location.

The elastic member may be disposed on the connection part.

The connection part may be configured so that the pedal unit is located vertically above a base of the cam block.

Advantageous Effects

According to a foot controller for a dental unit chair according to the present invention, it is possible for an operator to easily and conveniently control the amount of air supplied to a treatment tool provided in the dental unit chair.

However, the scope of the present invention is not limited by the above-described effects.

BEST MODE

Figure 1:
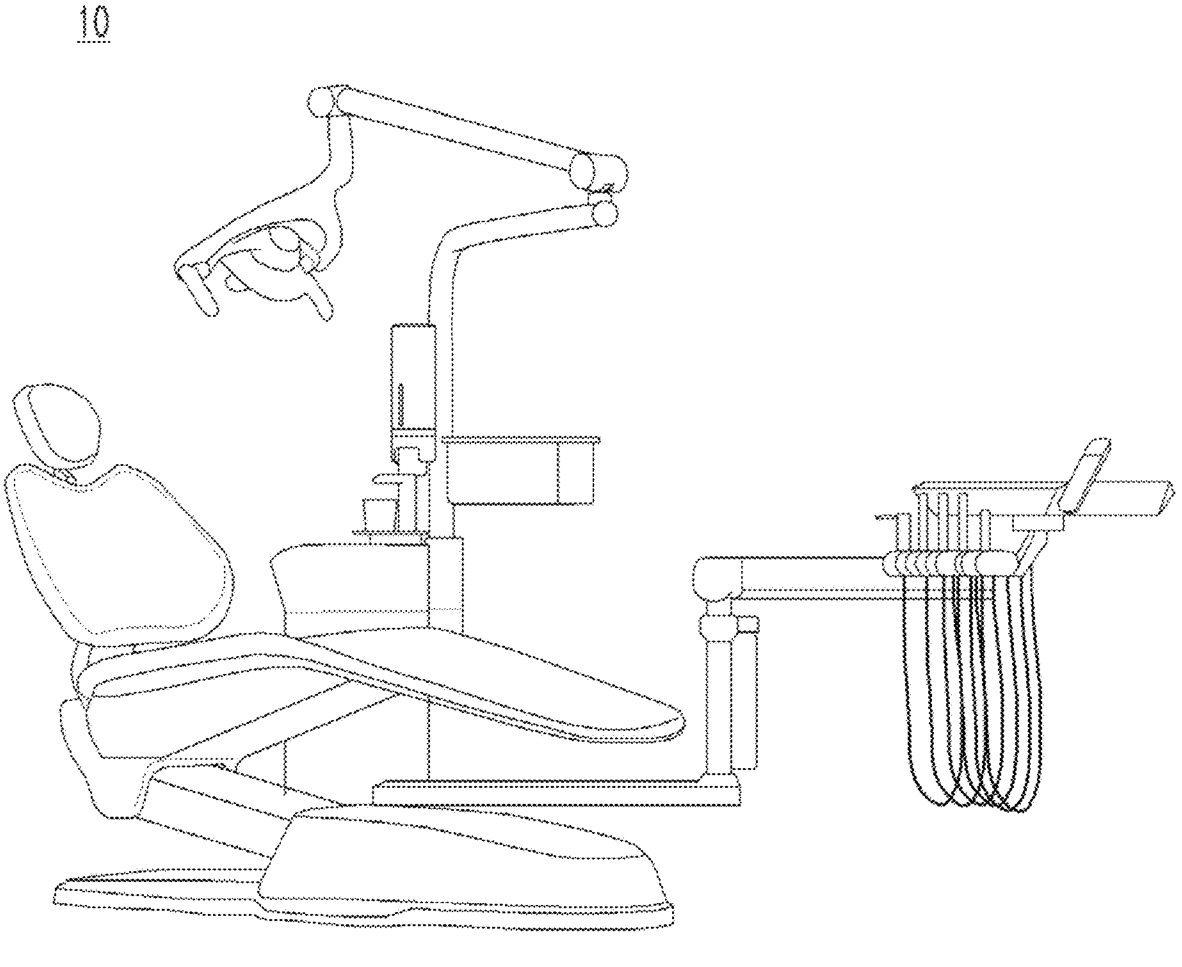
FIG. 1 is a diagram illustrating an appearance of a dental unit chair to which the present invention according to an example is applied.

The acting effects and technical configuration for the objects of a foot controller for a dental unit chair according to the present invention will be clearly understood by the following description in which exemplary embodiments of the present invention are described with reference to the accompanying drawings.

The following description illustrates only a principle of the present invention. Therefore, those skilled in the art may implement the principle of the present invention and invent various apparatuses included in the spirit and scope of the present invention although not clearly described or illustrated in the present specification. In addition, it is to be understood that all conditional terms and exemplary embodiments described in the present specification are basically intended only to allow those skilled in the art to understand a concept of the present invention, and the present invention is not limited to exemplary embodiments and states particularly mentioned described above.

Further, it is to be understood that all detailed descriptions mentioning specific exemplary embodiments of the present invention as well as principles, aspects, and exemplary embodiments of the present invention are intended to include structural and functional equivalences thereof. Further, it is to be understood that these equivalences include an equivalence that will be developed in the future as well as an equivalence that is currently well-known, that is, all elements invented so as to perform the same function regardless of a structure.

Further, when it is determined that a detailed description of the known art related to the present disclosure may obscure the gist of the present disclosure, the detailed description thereof will be omitted. Additionally, components in the accompanying drawings are not necessarily drawn to scale. For example, sizes of some of the components illustrated in the accompanying drawings may be exaggerated as compared with other components in order to assist in the understanding of exemplary embodiments of the present invention. Further, like reference numerals on different drawings will denote like components, and similar reference numerals on different drawings will denote similar components, but are not necessarily limited thereto.

Therefore, it is to be understood that, for example, block diagrams of the present specification illustrate a conceptual aspect of an illustrative circuit for embodying a principle of the present invention. Similarly, it is to be understood that all flow charts, state transition diagrams, pseudo-codes, and the like, illustrate various processes that may be tangibly embodied in a computer-readable medium and that are executed by computers or processors regardless of whether or not the computers or the processors are clearly illustrated.

Functions of various elements including processors or functional blocks represented as concepts similar to the processors and illustrated in the accompanying drawings may be provided using hardware having capability to execute software in connection with appropriate software as well as dedicated hardware. When the functions are provided by the processors, they may be provided by a single dedicated processor, a single shared processor, or a plurality of individual processors, and some of them may be shared with each other.

In addition, terms mentioned as a processor, a control, or a concept similar to the processor or the control should not be interpreted to exclusively cite hardware having capability to execute software, but should be interpreted to implicitly include digital signal processor (DSP) hardware and a read only memory (ROM), a random access memory (RAM), and a non-volatile memory for storing software without being limited thereto. The above-mentioned terms may also include well-known other hardware.

In the claims of the present specification, components represented as means for performing functions described in a detailed description are intended to include all methods of performing functions including all types of software including, for example, a combination of circuit elements performing these functions, firmware/micro codes, or the like, and are coupled to appropriate circuits for executing the software so as to execute these functions. It is to be understood that since functions provided by variously mentioned means are combined with each other and are combined with a method demanded by the claims in the present invention defined by the claims, any means capable of providing these functions are equivalent to means recognized from the present specification.

The above-mentioned objects, features, and advantages will become more obvious from the following detailed description associated with the accompanying drawings. Therefore, those skilled in the art to which the present invention pertains may easily practice a technical idea of the present invention.

Hereinafter, various example embodiments by the technical ideas of the present inventive concept will be described in detail with reference to the accompanying drawings.

FIG. 1 is a diagram illustrating an appearance of a dental unit chair to which the present invention according to an example is applied.

The dental unit chair 10 may basically include a seat on which examinee's legs are mounted, a backrest on which an examinee's back rests, and a headrest for supporting an examinee's head.

An armrest on which an examinee's arm rests may be formed on a side surface of at least one of the backrest and the seat.

In addition, the dental unit chair 10 may include a base for supporting the seat, a driving unit for driving at least one of the backrest and the seat, and a controller for controlling the driving unit.

In addition, the dental unit chair 10 includes at least one of a lighting unit for illuminating the examinee, a water supply unit for supplying gargle water for rinsing an examinee's mouth, a control unit, a display unit, and a foot control unit 20, and a power supply unit.

In addition, the dental unit chair 10 may include a work table.

A representative example of the work table is a doctor table for mounting various instruments for medical care and treatment in dentistry.

For example, the work table may be equipped with a surgical instrument, a medical care chart, or the like for medical care of an examinee who has visited dentistry, or an interface for manipulating the instrument.

The work table may be supplied with at least one of electricity, pneumatic, and hydraulic pressure to be used for operation of the surgical instrument. For example, an oral light that is one of the supplied electric furnace surgical instruments may be turned on.

In addition, the work table may include various switches. Considering a location of an operator, the work table may be located at a distance that the operator may easily reach with his or her hand.

Accordingly, various switches capable of controlling each unit of the dental unit chair 10 may be located on the work table.

Figure 2:
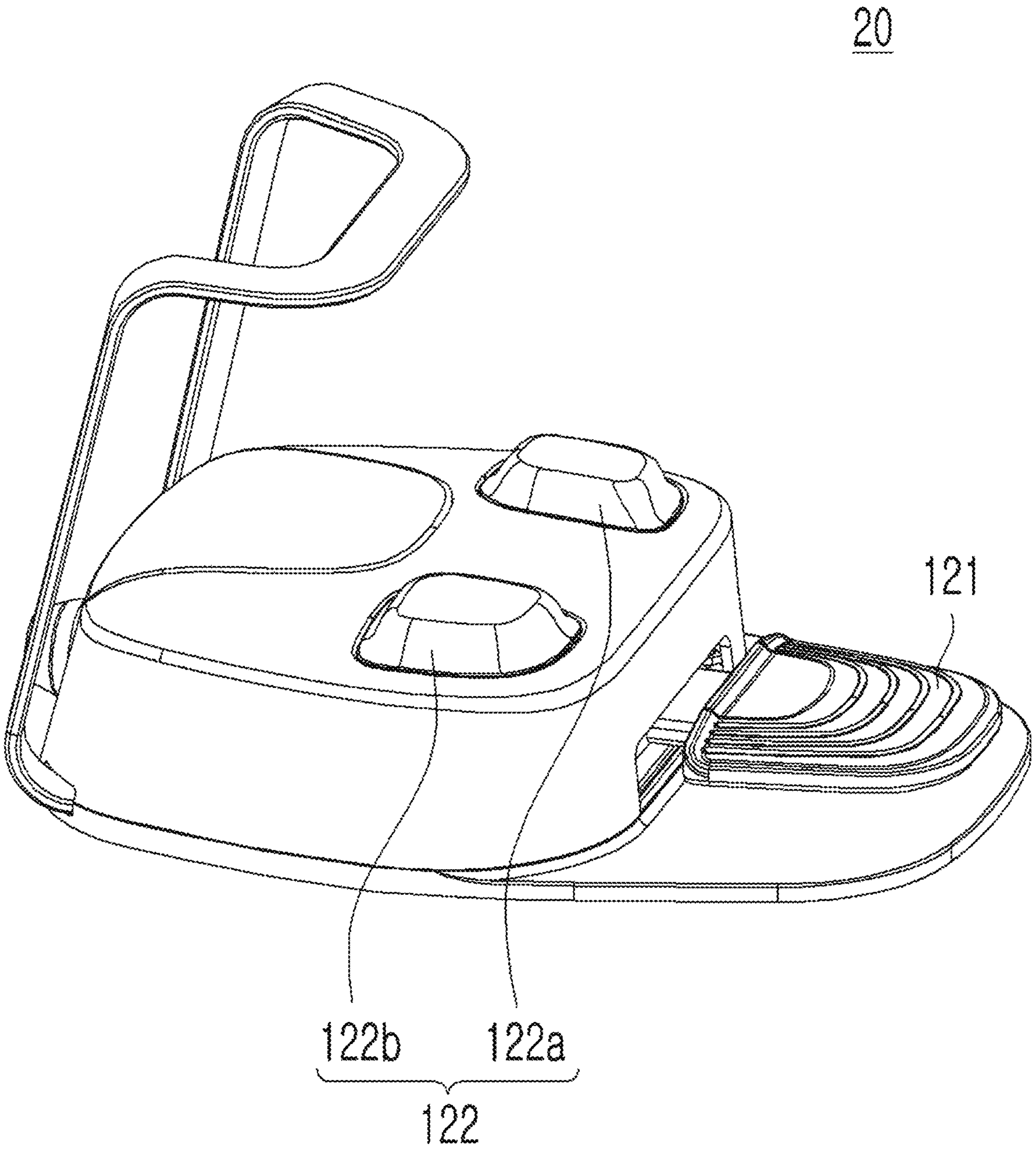
FIGS. 2 and 3 are diagrams illustrating an appearance of a foot controller according to an embodiment of the present invention.
Figure 3:
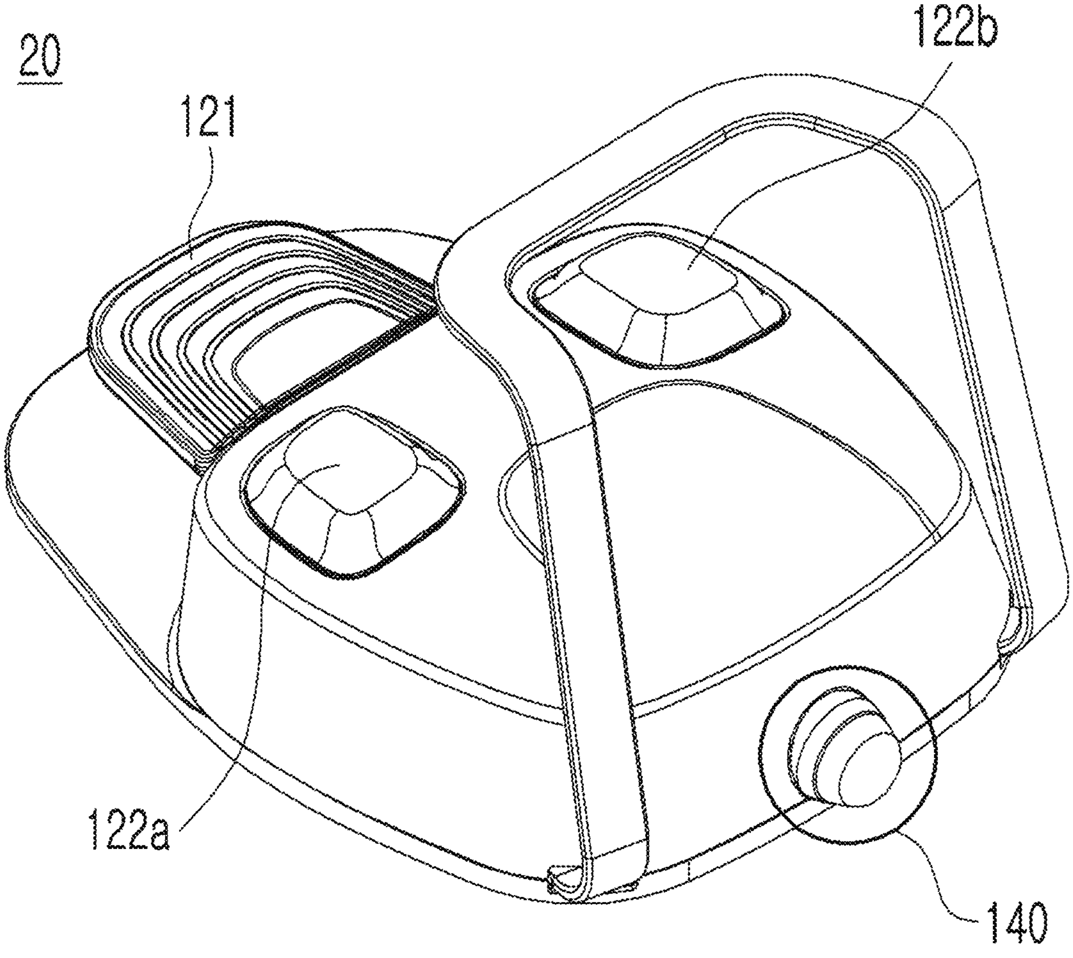
Figure 4:
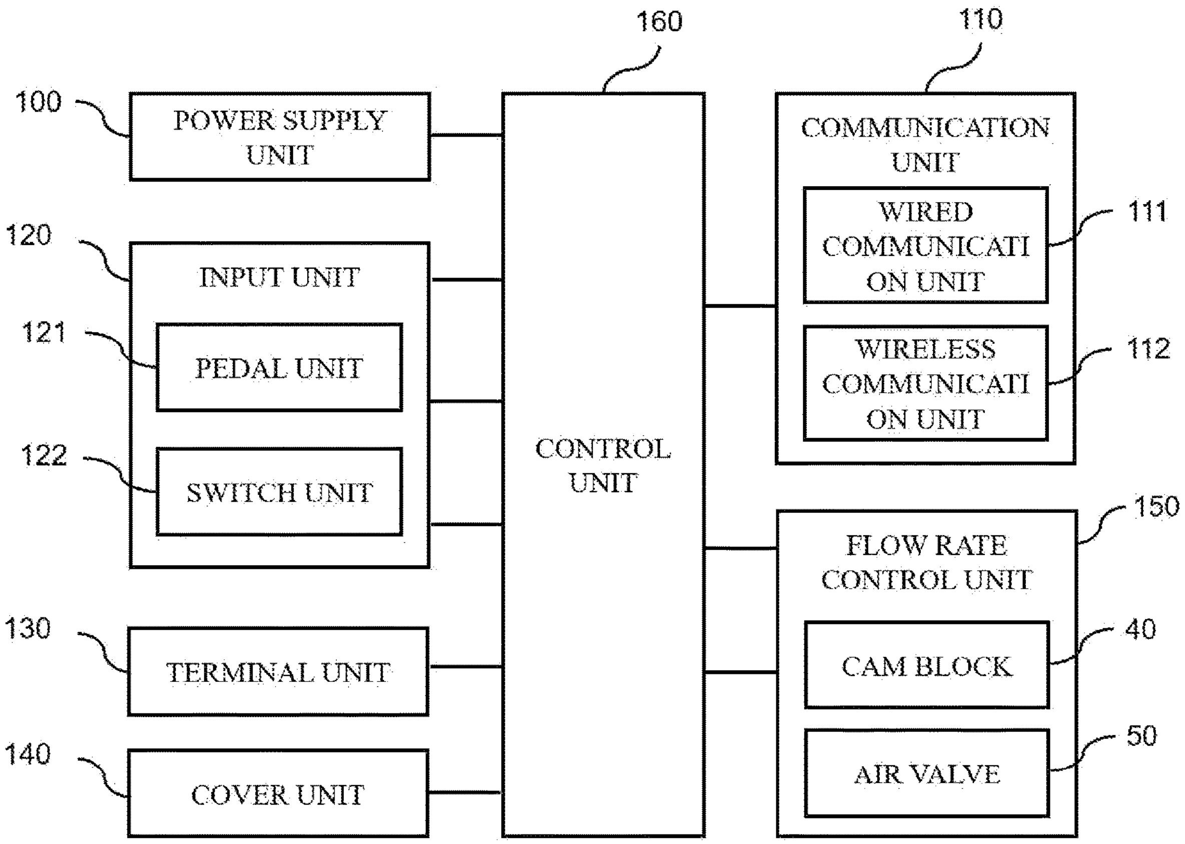
FIG. 4 is a block diagram of the foot controller according to the embodiment of the present invention.

FIGS. 2 and 3 are diagrams illustrating an appearance of a foot controller according to an embodiment of the present invention. FIG. 4 is a block diagram of the foot controller according to the embodiment of the present invention.

Referring to FIGS. 2 to 4, a foot controller 20 according to an embodiment of the present invention may be configured to include a power supply unit 100, a communication unit 110, an input unit 120, a terminal unit 130, and a cover part 140, a flow rate control unit 150, and a control unit 160.

The power supply unit 100 supplies power required for each component of the foot controller 20. Here, the power supply unit 100 may include a rechargeable battery.

The communication unit 110 is a module for communicating with the dental unit chair 10, and may include at least one of a wired communication unit 111 for performing wired communication with the dental unit chair 10, and wireless communication unit 112 for performing wireless communication with the dental unit chair 10.

As described above, the dental unit chair 10 includes a plurality of objects. For example, the plurality of objects may include a seat, a backrest, a lighting device, and a treatment tool.

Examples of the treatment tool include a high-speed handpiece, a low-speed handpiece, a three-way-syringe, a scaler, and the like.

That is, the communication unit 110 may perform a function of transmitting a control signal generated by the foot controller 20 to the dental unit chair 10 in order to control a plurality of objects.

Figure 5:
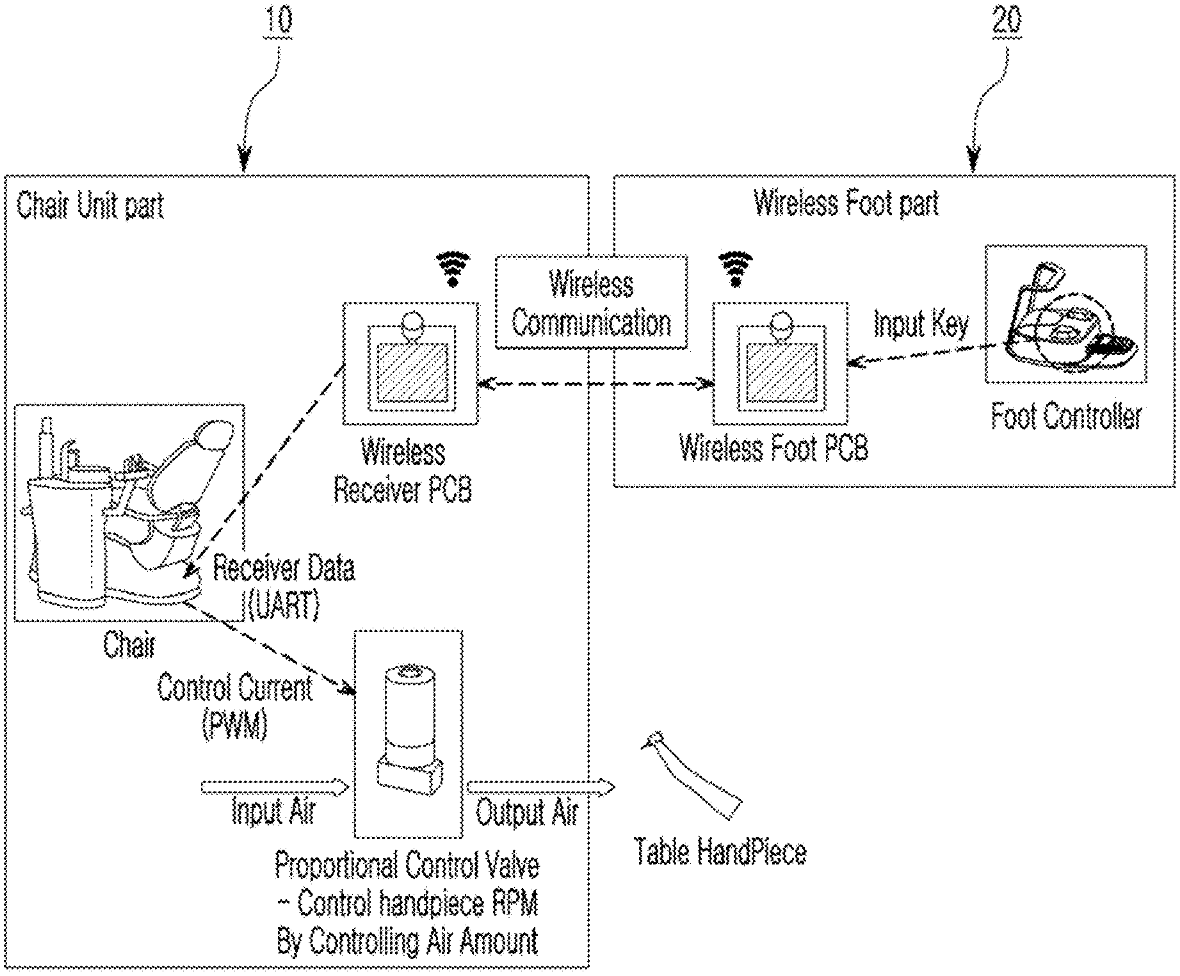
FIG. 5 is a diagram illustrating a concept of wireless communication between a foot controller 20 and a dental unit chair 10 according to an embodiment of the present invention.

FIG. 5 is a diagram illustrating a concept of wireless communication between a foot controller 20 and a dental unit chair 10 according to an embodiment of the present invention.

Wireless communication referred to in this specification includes short-range wireless communications including ZigBee, Bluetooth, and the like. However, the wireless communication mentioned herein is not limited thereto.

Figure 6:
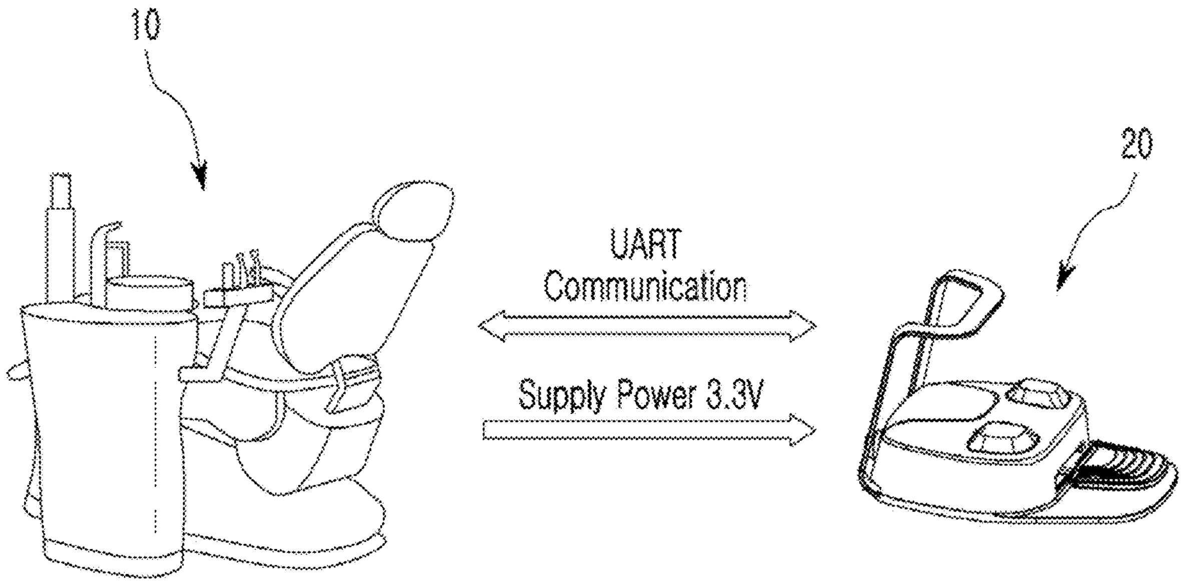
FIG. 6 is a diagram illustrating a concept of wired communication between the foot controller 20 and the dental unit chair 10 according to the embodiment of the present invention.

FIG. 6 is a diagram illustrating a concept of wired communication between the foot controller 20 and the dental unit chair 10 according to the embodiment of the present invention.

As illustrated in FIG. 6, when the dental unit chair 10 and the foot controller 20 communicate in a wired manner, the dental unit chair 10 may supply power to the foot controller 20 through a cable. In this case, the battery provided in the foot controller 20 may also be charged.

The wired communication described in this specification may include at least one of a local area network (LAN), Ethernet, and Wi-Fi. However, the wireless communication described in this specification is not limited thereto.

The input unit 120 may receive a command for controlling a plurality of objects provided in the dental unit chair 10.

The input unit 120 may include a pedal unit 121 and a switch unit 122 as illustrated in FIGS. 3 and 4.

A user may input a specific command by rotating the pedal unit 121 left and right using a foot and then stepping on the pedal unit 121 at a specific location.

In addition, the user may input a command assigned to the first switch **122*a* or the second switch 122*b* by stepping on the switch units 122*a* and 122*b***.

The terminal unit 130 is connected to a wired communication cable for performing wired communication with the dental unit chair 10.

The cover part 140 is a component for covering the terminal part 130 with a stopper or the like to protect the terminal unit 130 from dust.

The flow rate control unit 150 may perform a function of controlling a flow rate of air flowing into the treatment tool provided in the dental unit chair 10.

To this end, the flow rate control unit 150 may include a cam block 40 and an air valve 50. A detailed description of the flow control unit 150 will be described later with reference to the necessary drawings.

The control unit 160 may control the overall operation of the foot controller 20 according to an embodiment of the present invention and manage the flow of information or data between each component.

Accordingly, the controller 160 includes at least one processor and an execution memory (e.g., registers and/or random access memory (RAM)) including a central processing unit (CPU)/micro processing unit (MPU) in hardware, and a bus (or internal cable) for inputting and outputting predetermined data.

In addition, the control unit 160 may include a predetermined program routine and/or program data that is loaded from a predetermined recording medium into an execution memory and is computed by the processor to perform various operations and functions of the foot controller 20 in software according to an embodiment of the present invention.

In addition, for example, more specifically, the control unit 160 may control all or part of the power supply unit 100, the communication unit 110, the input unit 120, the terminal unit 130, the cover part 140, and the flow rate control unit 150.

For example, the control unit 160 may transmit a command received through the input unit 120 to the dental unit chair 10 through the communication unit 110.

The dental unit chair 10 is also provided with a separate communication unit. The communication unit provided in the dental unit chair 10 may also include a wired communication module and a wireless communication module, respectively, like the foot controller 20.

Figure 7:
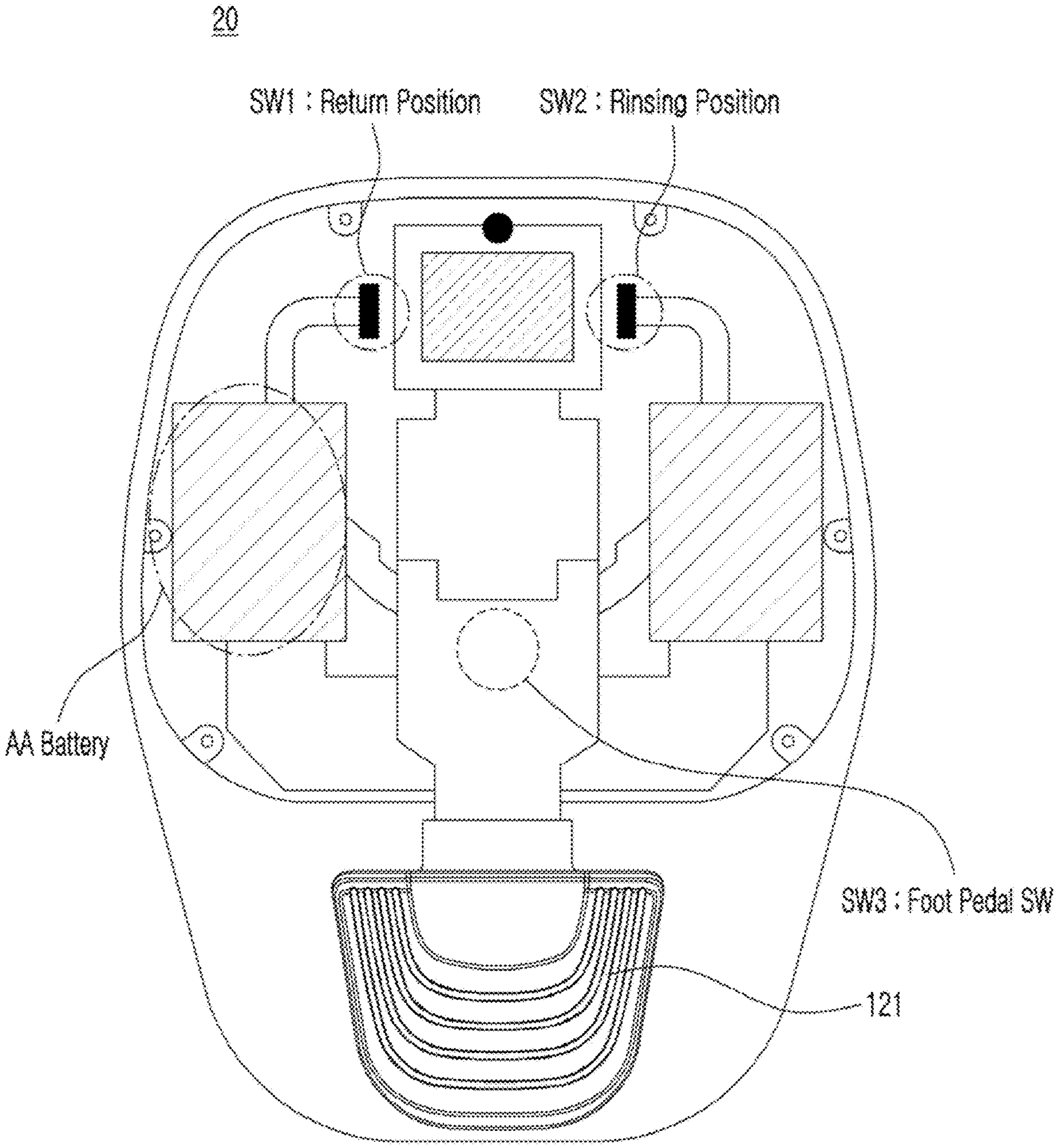
FIGS. 7 and 8 are diagrams illustrating an example of an internal configuration of the foot controller according to the embodiment of the present invention.
Figure 8:
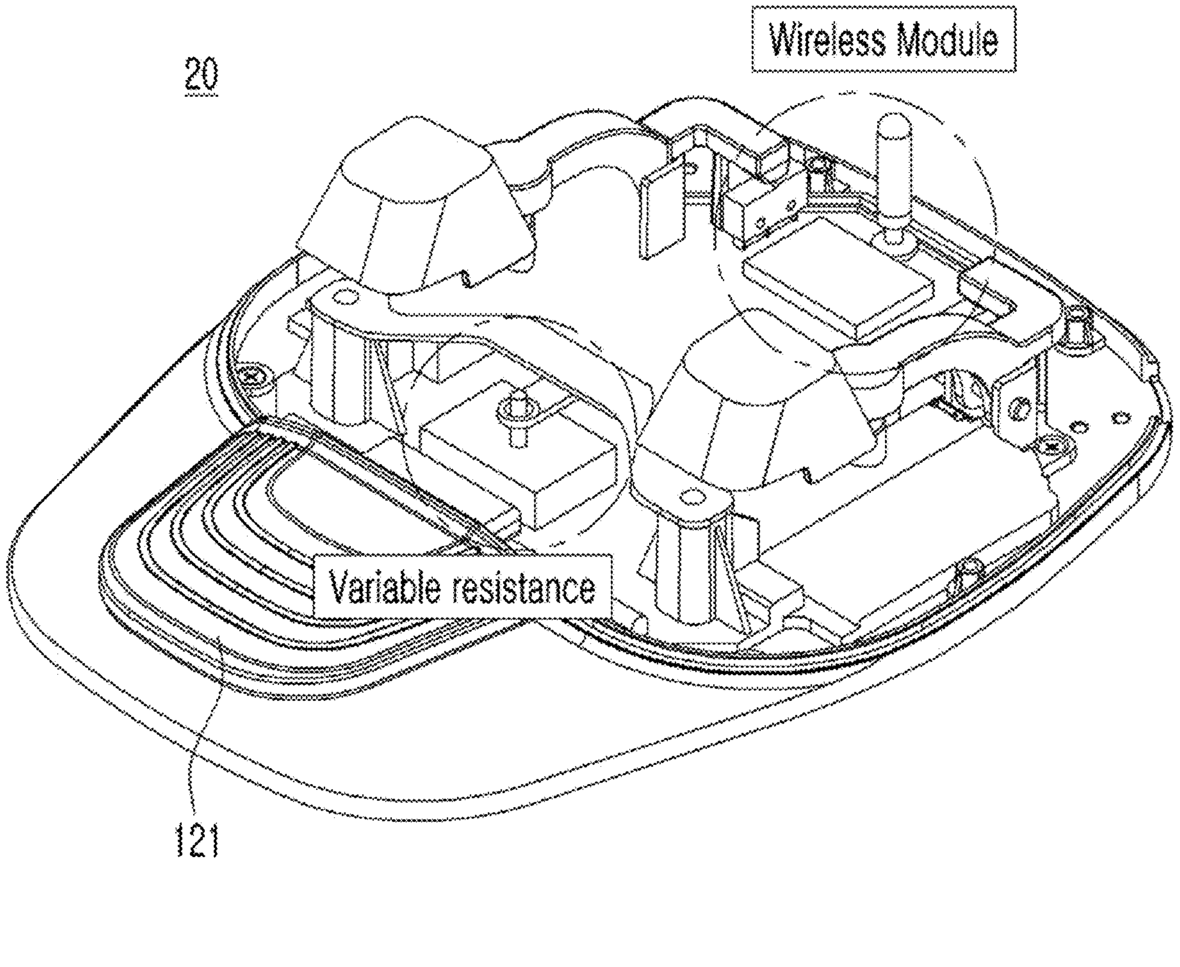

FIGS. 7 and 8 are diagrams illustrating an example of an internal configuration of the foot controller according to the embodiment of the present invention.

Figure 9:
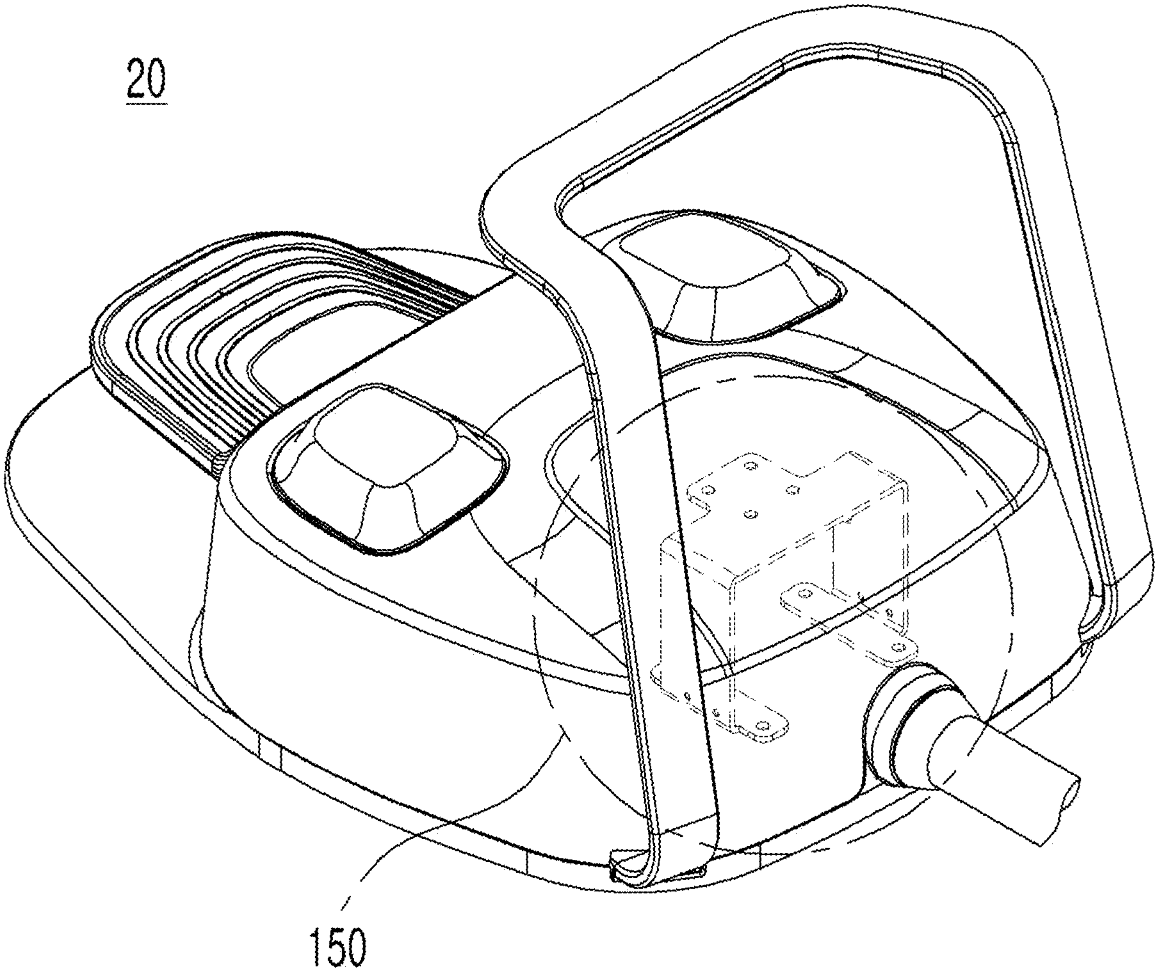
FIGS. 9 to 11 are perspective views of the foot controller according to the embodiment of the present invention.
Figure 10:
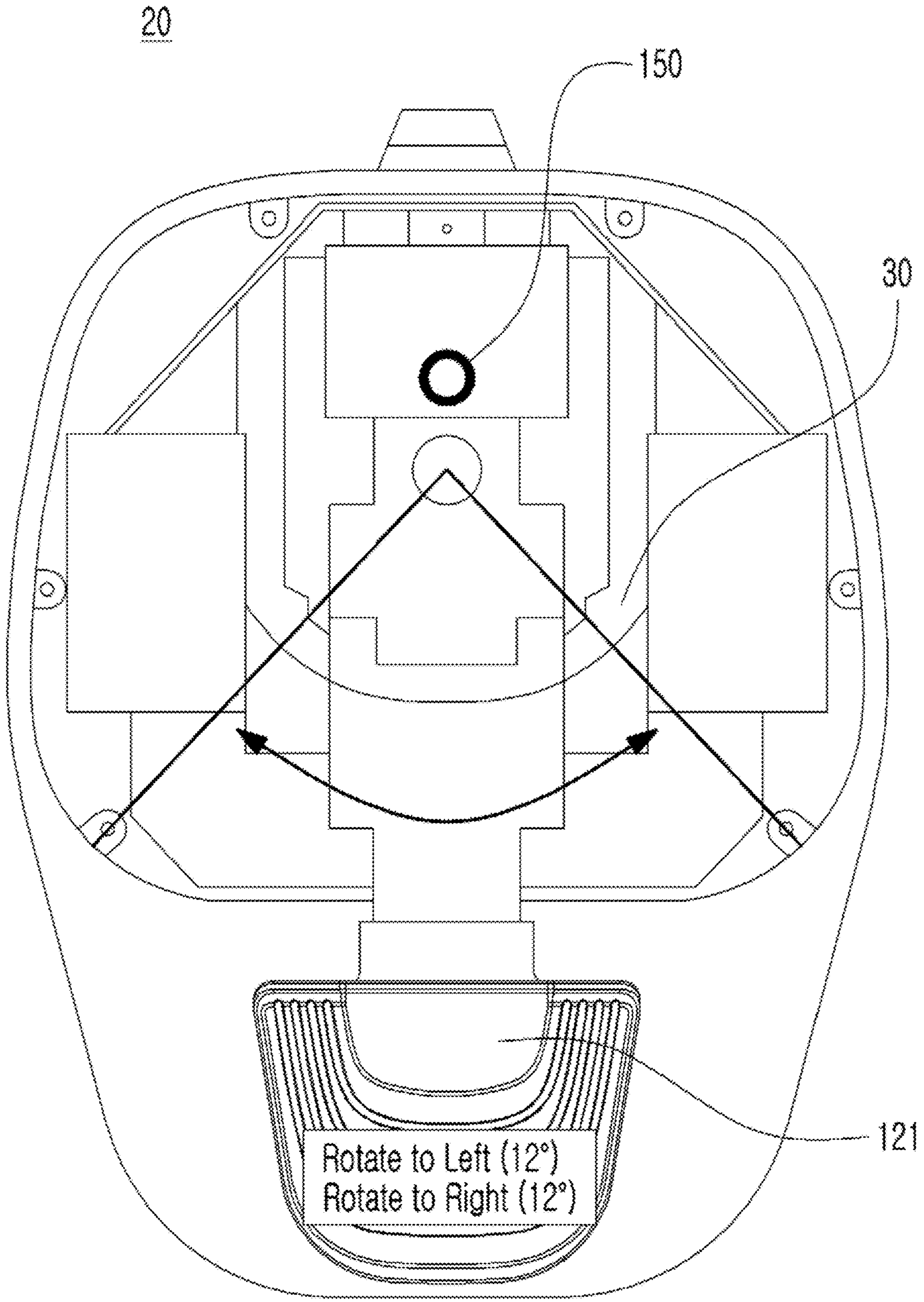
Figure 11:
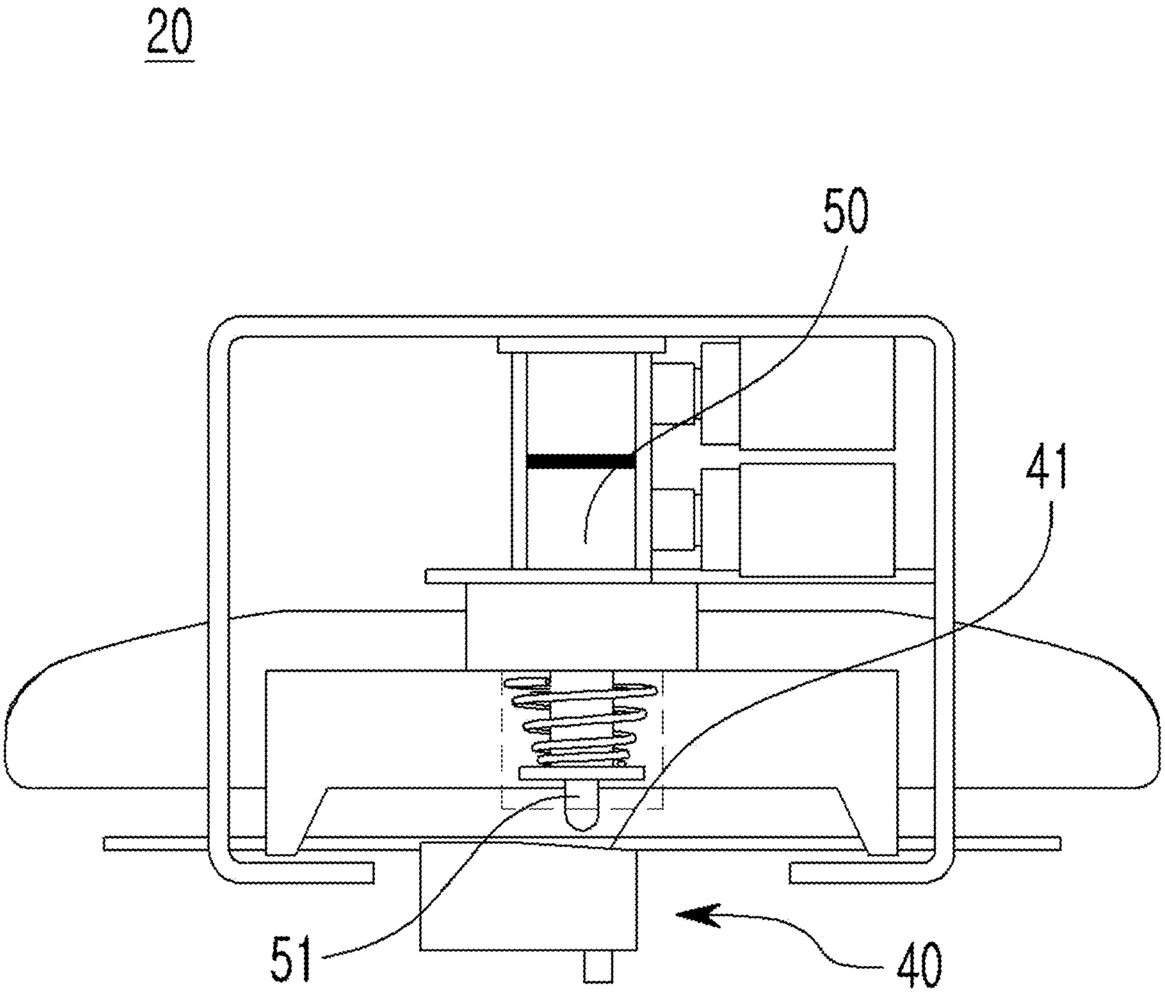
Figure 12:
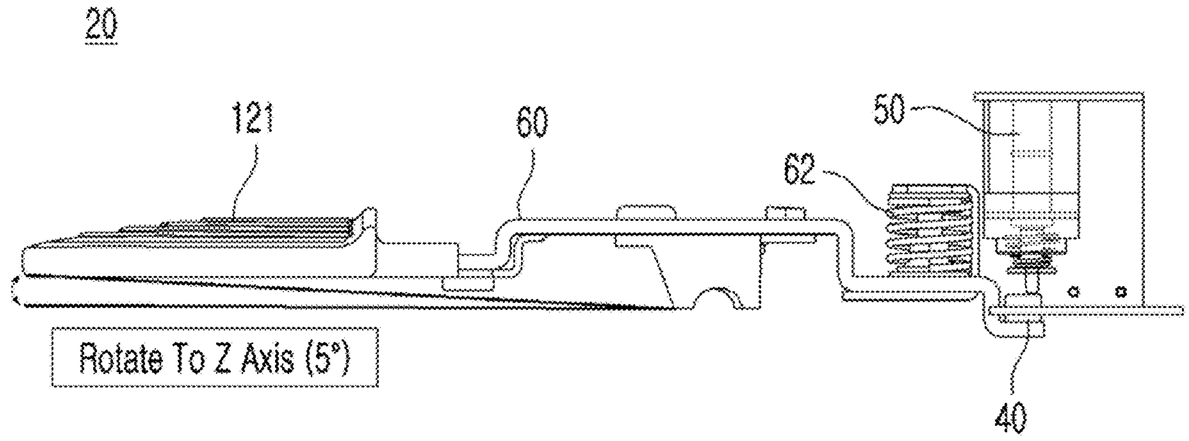
FIG. 12 is a side view of some components of the foot controller according to the embodiment of the present invention.

FIGS. 9 to 11 are perspective views of the foot controller according to the embodiment of the present invention. In particular, FIG. 10 is a top perspective view of a foot controller according to an embodiment of the present invention, and FIG. 11 is a front perspective view of the foot controller according to an embodiment of the present invention. FIG. 12 is a side view of some components of the foot controller according to the embodiment of the present invention.

The air valve 50 may perform a function of controlling the flow rate of air supplied to the treatment tool provided in the dental unit chair 10. The RPM of the treatment tool may be controlled by controlling the flow rate of air supplied to the treatment tool.

An air inlet pipe and an air outlet pipe are connected to the air valve 50, and air may be supplied to the treatment tool through the air outlet pipe.

As illustrated in FIG. 11, the air valve 50 may include a rod 51. The flow rate of air supplied to the treatment tool may vary according to the degree of pressing of the rod 51.

Since the structure of the air valve 50 and the rod 51 provided therein and their operations are known techniques, further detailed description thereof will be omitted.

As illustrated in FIGS. 11 and 12, the cam block 40 has an inclined surface 41 and is installed under the rod 51.

That is, as illustrated in FIG. 11, the cam block 40 has an inclined surface 41 on which one side of the upper surface (e.g., the right in the example of FIG. 11) is gradually lowered toward the ground.

FIG. 11 illustrates components viewed through the pedal unit 121 toward the flow rate control unit 150 in FIG. 10.

In addition, as illustrated in FIG. 11, the cam block 40 may have the inclined surface 41 formed on a part of the upper surface instead of the entire upper surface, or have the inclined surface formed on the entire upper surface of the cam block 40.

In addition, as illustrated in FIGS. 10 and 12, the pedal unit 121 is disposed at a location spaced apart from the cam block 40 included in the flow rate control unit 150 by a predetermined distance, and as described above, may rotate left and right by external force and move up and down.

For example, the operator may move the pedal unit 121 up and down by rotating the pedal unit 121 left and right using a foot or stepping on the pedal unit 121 with a foot at a specific location.

In addition, as illustrated in FIG. 12, the foot controller 20 according to the embodiment of the present invention may further include a connection part 60 connecting the pedal unit 121 and the cam block 40 so that the cam block 40 moves in conjunction with the movement of the pedal unit 121 (i.e., left and right rotation or up and down movement).

Therefore, when the pedal unit 121 rotates left and right by the connection part 60, the cam block 40 rotates left and right in conjunction with the pedal unit 121, and when the pedal unit 121 moves up and down, the cam block 40 may move up and down in conjunction with the pedal unit 121.

A detailed description of the left and right rotation and up and down movement of the cam block 40 according to the left and right rotation and up and down movement of the pedal unit 121 will be described below with reference to FIGS. 16 to 19.

Meanwhile, the connecting part 60 may be configured so that the pedal unit 121 is located vertically above the base of the cam block 40, but is not limited thereto.

For example, referring to FIG. 12, the pedal unit 121 is disposed farther away from the ground than the base of the cam block 40. The relative locations of the pedal unit 121 and the cam block 40 may vary depending on the configuration (e.g., the shape of the connection part 60) of the connection part 60.

The connection part 60 may be made of a metal material having a predetermined thickness in order to firmly connect the pedal unit 121 and the cam block 40, but is not limited thereto.

As illustrated in FIG. 12, the foot controller 20 according to the embodiment of the present invention may further include an elastic member 62.

When the downward movement of the pedal unit 121 occurs by the external force (for example, when the operator steps on the pedal unit 121 with a foot) and then the external force disappears (for example, when an operator takes his/her foot off the pedal unit 121), the elastic member 62 may provide a restoring force for returning the pedal unit 121 to its original location.

As illustrated in FIG. 12, the elastic member 62 may be disposed on the connection part 60.

Meanwhile, as illustrated in FIG. 10, the foot controller 20 according to the embodiment of the present invention may further include a rail 30 for guiding the left and right rotation of the pedal unit 121.

Figure 13:
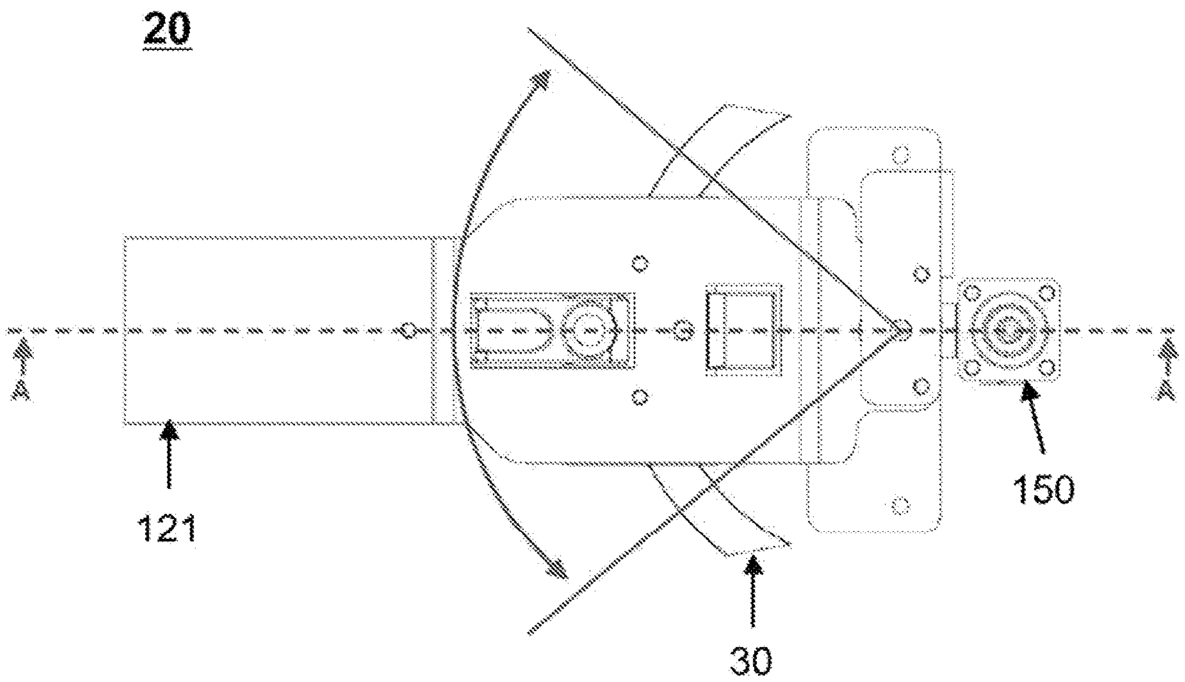
FIGS. 13 to 15 are diagrams illustrating a state in which a pedal unit is located at an exact center with respect to a rail.

When the pedal unit 121 rotates left and right, as illustrated in FIGS. 10 and 13, a range of the left and right rotation may be limited by the length of the rail 30.

For example, as illustrated in FIG. 10, the pedal unit 121 may rotate 12° to the left and 12° to the right, but is, of course, not limited thereto. It should be clearly noted that 12° to the left and 12° to the right illustrated in FIG. 10 are merely examples.

On the other hand, when the cam block 40 rotates left and right according to the left and right rotation of the pedal unit 121, the air valve 50 and the cam block 40 may be disposed so that the rod 51 of the air valve 50 is always located above the inclined surface 41 formed on the cam block 40.

Because, when an operator steps on the pedal unit 121 with a foot (moving the pedal unit 121 downward), the cam block 40 moves upward by the connection part 60 to press the rod 51.

In addition, the air valve 50 and the cam block 40 may be disposed so that the distance between the inclined surface 41 and the rod 51 is changed by the left and right rotation of the connection part 60 according to the left and right rotation of the pedal unit 121. A detailed description thereof will be provided below in more detail with reference to FIGS. 16 to 19.

Figure 14:
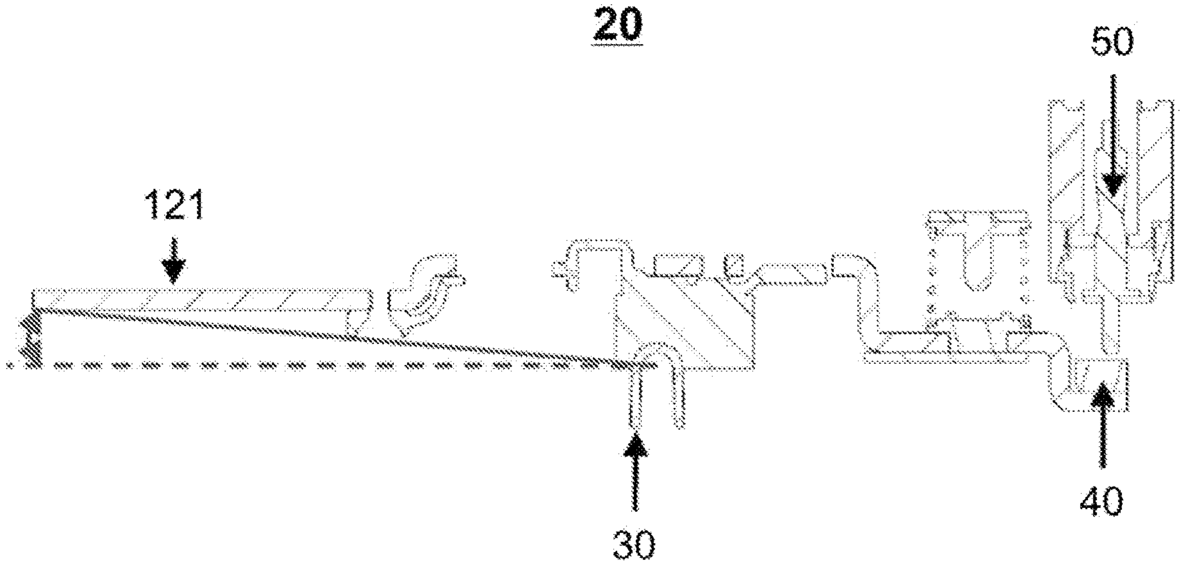
Figure 15:
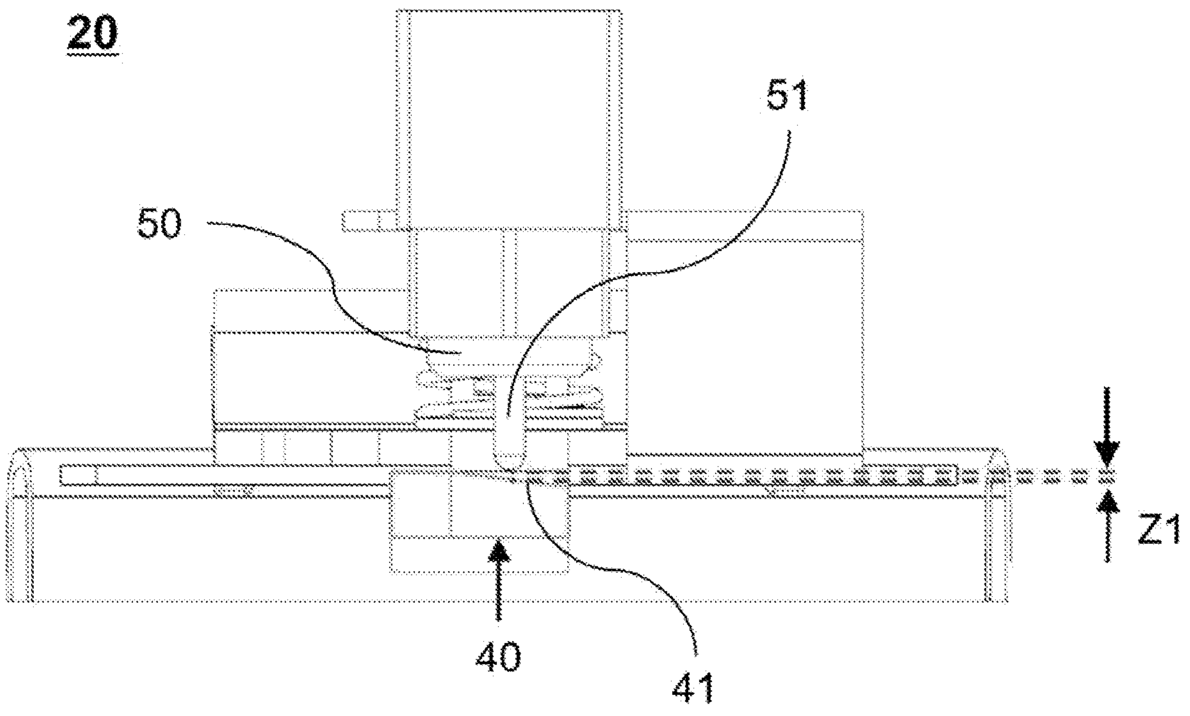

FIGS. 13 to 15 are diagrams illustrating a state in which the pedal unit is located at an exact center with respect to a rail.

When the pedal unit 121 is located at the exact center with respect to a rail 30 ("AA" in FIG. 13), in a state in which an operator does not step on the pedal unit 121 with a foot, a vertical distance between the inclined surface 41 and the rod 51 is Z1 (see FIG. 15).

Figure 16:
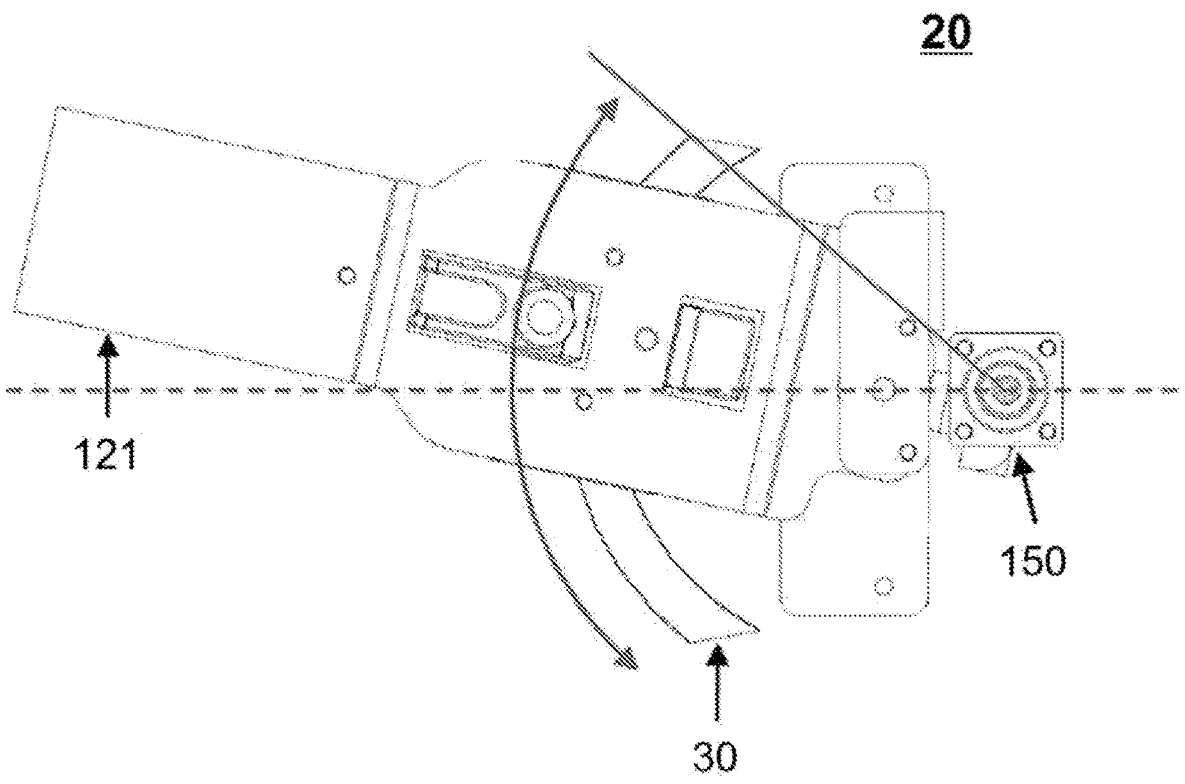
FIGS. 16 and 17 are diagrams illustrating a case in which the pedal unit rotates to the left with respect to the rail.
Figure 17:
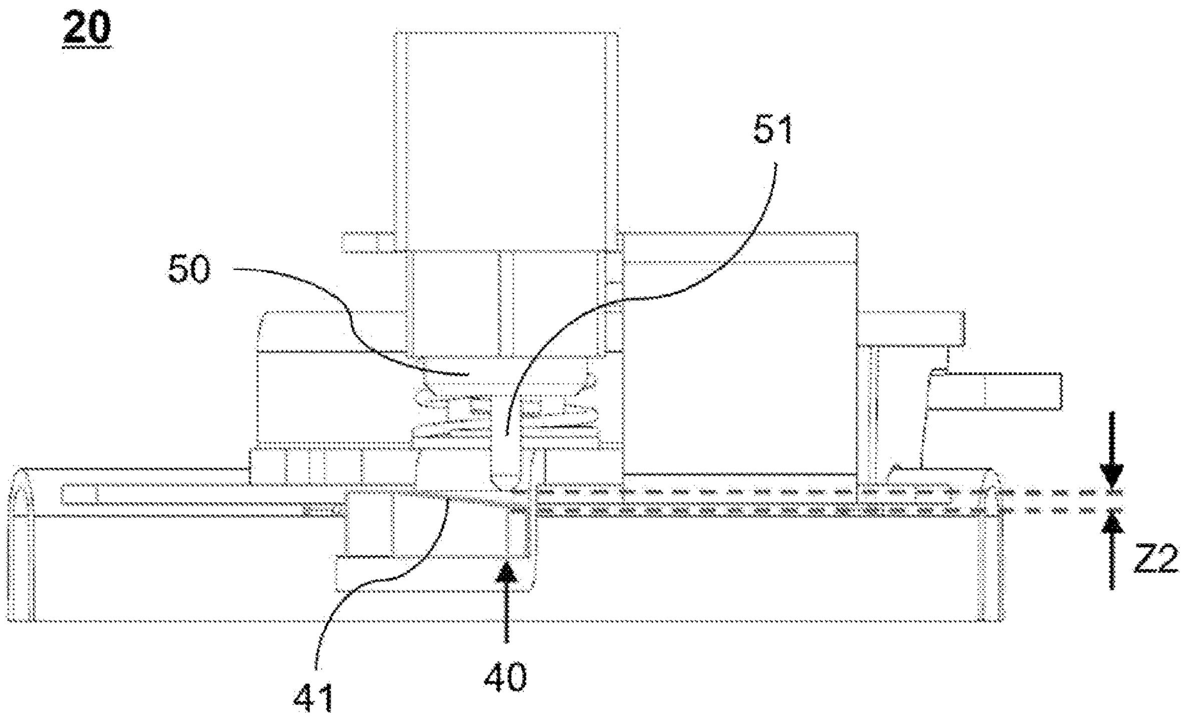

FIGS. 16 and 17 are diagrams illustrating a case in which the pedal unit rotates to the left with respect to the rail.

Referring to FIGS. 16 and 17, in a state in which an operator rotates the pedal unit 121 to the left and does not step on the pedal unit 121 with a foot, the vertical distance between the inclined surface 41 and the rod 51 is Z2 (see FIG. 17).

Figure 18:
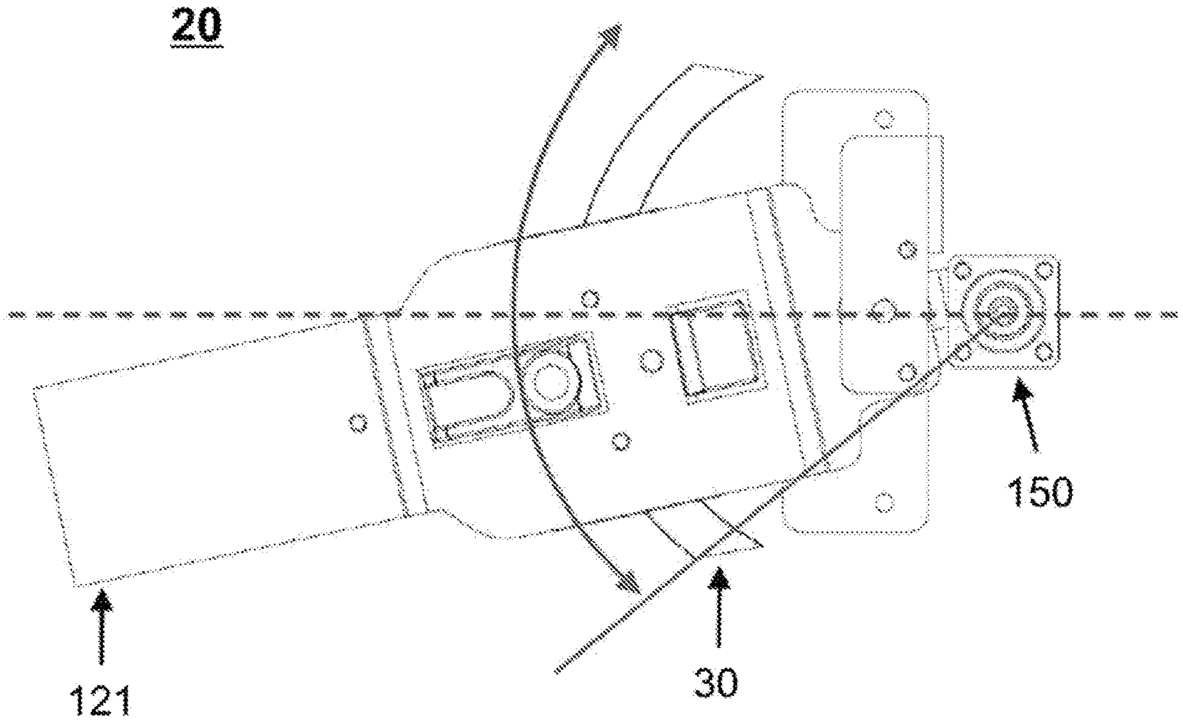
FIGS. 18 and 19 are diagrams illustrating a case in which the pedal unit rotates to the right with respect to the rail.
Figure 19:
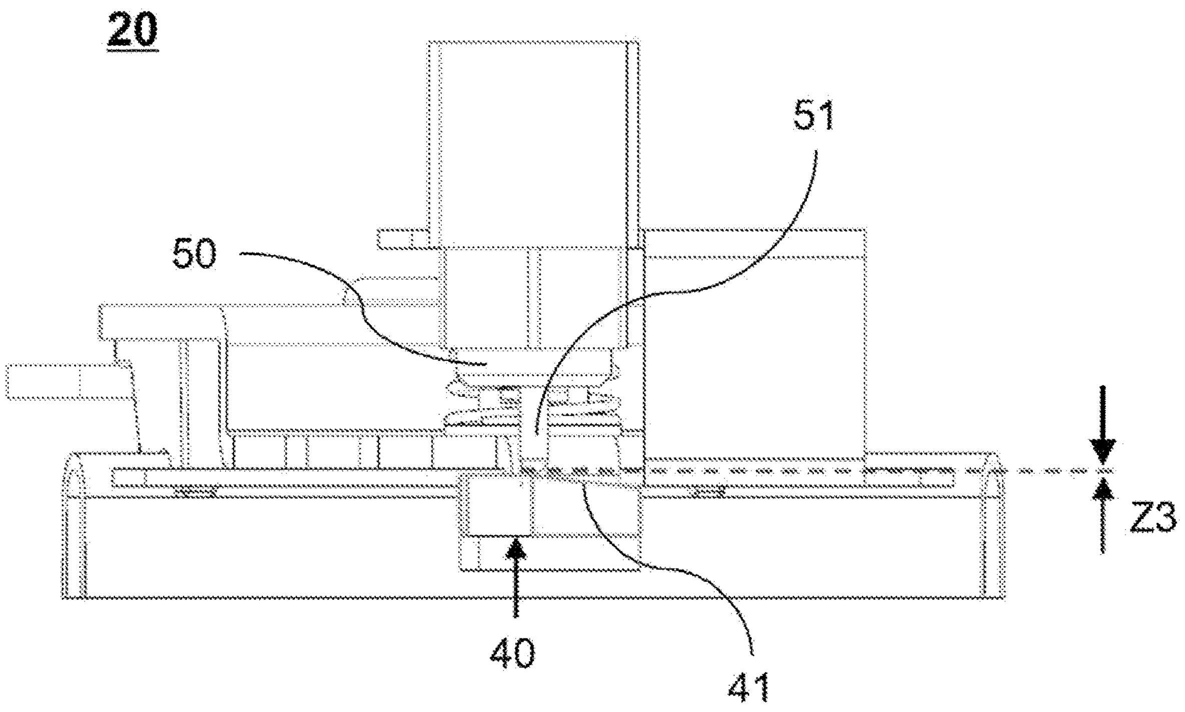

FIGS. 18 and 19 are diagrams illustrating a case in which the pedal unit rotates to the right with respect to the rail.

Referring to FIGS. 18 and 19, in a state in which an operator rotates the pedal unit 121 to the right and does not step on the pedal unit 121 with a foot, the vertical distance between the inclined surface 41 and the rod 51 is Z3 (see FIG. 19).

It should be noted that FIGS. 15, 17 and 19 are diagrams when viewed from the pedal unit 121 side toward the cam block 40.

For example, when an operator rotates the pedal unit 121 to the left as illustrated in FIG. 16, the rod 51 is located on the right of the cam block 40 as illustrated in FIG. 17.

In addition, when an operator rotates the pedal unit 121 to the right as illustrated in FIG. 18, the rod 51 is located on the left of the cam block 40 as illustrated in FIG. 19.

Here, when the distances of Z1, Z2, and Z3 are compared, the Z2 value is the largest and the Z3 value is the smallest.

As described above, the air valve 50 and the cam block 40 are disposed so that the rod 51 is pressed or unpressed by the up and down movement of the connection part 60 according to the vertical movement of the pedal unit 121.

In addition, the degree of pressing of the rod 51 may vary according to the location at which the pedal unit 121 moves downward in the range of the left and right rotation of the pedal unit 121.

The air valve 50 controls the amount of air supplied to the treatment tool as the degree of pressing of the rod 51 varies.

Meanwhile, the range of the up and down movement of the pedal unit 121 may also be limited in the same way that the range of the left and right rotation may be limited.

For example, the range of the up and down movement of the pedal unit 121 may be limited in such a way that the pedal unit 121 moves downward only until it reaches the ground or the base in the state in which the pedal unit 121 is spaced apart from the ground or the base constituting a lower end portion of the foot controller 20 (in the state in which an operator does not step on the pedal unit 121).

However, the range of the up and down movement of the pedal unit 121 may be limited by various mechanical configurations of the foot controller 20.

For example, as illustrated in FIG. 12, the pedal unit 121 may move (rotate) by 5° in the vertical direction (Z axis). Of course, the limited range of the up and down movement (rotation) of the pedal unit 121 is not limited to the above 5°. Hereinafter, for convenience of explanation, it is assumed that the pedal unit 121 moves (rotates) up and down by 5°.

An example of the control or change of the supply amount of air of the air valve 50 by the pressing of the rod 51 described above is as follows.

For example, referring to FIGS. 13 to 15, when an operator steps on the pedal unit 121 in a state in which the pedal unit 121 is located at the exact center with respect to the rail 30, the cam block 40 presses the rod 51 by a distance (hereinafter referred to as "D1") corresponding to an angle obtained by subtracting an angle corresponding to Z1 from 5°.

Here, the air valve 50 supplies air to the treatment tool at a flow rate corresponding to D1.

In addition, for example, referring to FIGS. 16 and 17, when an operator steps on the pedal unit 121 in a state in which the pedal unit 121 is located on the left with respect to the rail 30, the cam block 40 presses the rod 51 by a distance (hereinafter referred to as "D2") corresponding to an angle obtained by subtracting an angle corresponding to Z2 from 5°.

Here, the air valve 50 supplies air to the treatment tool at a flow rate corresponding to D2.

Of course, since Z2 is greater than Z1, D2 is smaller than D1.

In addition, for example, referring to FIGS. 18 and 19, when an operator steps on the pedal unit 121 in a state in which the pedal unit 121 is located on the right with respect to the rail 30, the cam block 40 presses the rod 51 by a distance (hereinafter referred to as "D3") corresponding to an angle obtained by subtracting an angle corresponding to Z2 from 5°.

Here, the air valve 50 supplies air to the treatment tool at a flow rate corresponding to D3.

Of course, since Z3 is less than Z1, D3 is greater than D1.

In the above-described manner, an operator uses the foot to rotate the pedal unit 121 left and right and/or up and down movement, so that the flow rate of air supplied to the treatment tool provided in the dental unit chair through the air valve 50 may be controlled.

In the present specification, 'an exemplary embodiment' and the like and other modified expressions of principles of the present disclosure mean that specific features, structures, characteristics, or the like, are included in at least one exemplary embodiment of the principles of the present disclosure. Accordingly, the expression "an exemplary embodiment" and other modified examples in the present specification may not denote the same embodiment.

When a method in the present specification is described as comprising a series of steps, the order of those steps presented herein is not necessarily the order in which those steps can be performed, and any described steps may be omitted and/or may be omitted herein. Any other steps not described herein could be added to the method.

In addition, unless explicitly described to the contrary, a singular form includes a plural form in the present specification. In addition, components, steps, operations, and elements mentioned by terms 'include' or 'including' used in the present specification mean the existence or addition of one or more other components, steps, operations, elements, and devices.

Hereinabove, the present disclosure has been described with reference to exemplary embodiments. All exemplary embodiments and conditional illustrations disclosed in the present disclosure have been described to intend to assist in the understanding of the principle and the concept of the present invention by those skilled in the art to which the present invention pertains. Therefore, it will be understood by those skilled in the art to which the present invention pertains that the present invention may be implemented in modified forms without departing from the spirit and scope of the present invention. Therefore, embodiments disclosed herein should be considered in an illustrative aspect rather than a restrictive aspect.

The scope of the present invention should be defined by the claims rather than the above-mentioned description, and equivalents to the claims should be interpreted to fall within the present invention.

The invention claimed is:

1. A foot controller for a dental unit chair for controlling a treatment tool provided in the dental unit chair, the foot controller comprising:

an air valve controlling a flow rate of air supplied to the treatment tool;

a cam block installed under a rod provided in the air valve and having an inclined surface;

a pedal unit disposed at a location spaced apart from the cam block by a predetermined distance and rotatable left and right by an external force and movable up and down; and a connection connecting the cam block and the pedal unit so that the cam block moves in conjunction with movement of the pedal unit, wherein the air valve and the cam block are disposed so that a distance between the inclined surface and the rod is changed by the left and right rotation of the cam block according to the left and right rotation of the pedal unit.

2. The foot controller of claim 1, further comprising:

when the pedal unit moves downward by an external force and then the external force disappears, an elastic member configured to provide a restoring force to return the pedal unit to an original location, wherein the elastic member is disposed on the connection part.

3. The foot controller of claim 1, wherein the connection is configured so that the pedal unit is located vertically above a base of the cam block.

4. The foot controller of claim 1, wherein, when the cam block rotates left and right according to the left and right rotation of the pedal unit, the air valve and the cam block are disposed so that the rod of the air valve is always located above the inclined surface.

5. The foot controller of claim 1, further comprising:

a rail configured to guide a left and right rotation of the pedal unit.

6. The foot controller of claim 5, wherein a range of the left and right rotation of the pedal unit is limited by a length of the rail.

7. The foot controller of claim 1, wherein the air valve and the cam block are disposed so that the rod is pressed or unpressed by the up and down movement of the cam block according to the up and down movement of the pedal unit.

8. The foot controller of claim 7, wherein a degree of pressing of the rod varies according to a location at which the pedal unit moves downward in a range of the left and right rotation of the pedal unit.

9. The foot controller of claim 8, wherein the air valve controls an amount of air supplied to the treatment tool as the degree of pressing of the rod varies.

* * * * *